United States Patent [19]

Elbow

[11] 4,272,107
[45] Jun. 9, 1981

[54] TIDE TIME INDICATOR

[76] Inventor: William T. Elbow, South Rd., Chilmark, Mass. 02535

[21] Appl. No.: 63,337

[22] Filed: Aug. 2, 1979

[51] Int. Cl.$^3$ ............... B42D 15/00; G09B 29/00
[52] U.S. Cl. ............... 283/1 A; 235/88 R; 235/88 N; 235/70 A; 235/61 R; 235/70 R; 283/34
[58] Field of Search ...... 235/70 R, 70 A, 85 R–89 R; 283/3, 34, 35, 37, 1 R, 1 A, 44; 35/40, 44; 33/1 SB, 1 SD

[56] References Cited

U.S. PATENT DOCUMENTS

| | | | |
|---|---|---|---|
| 1,486,082 | 3/1924 | Fowler | 235/70 A |
| 3,135,465 | 6/1964 | Squier et al. | 235/70 R |
| 3,638,311 | 2/1972 | Chin | 235/61 R X |
| 3,745,313 | 7/1973 | Spilhaus | 235/88 |
| 3,825,181 | 7/1974 | Banner | 235/88 |
| 3,924,104 | 12/1975 | Barron | 235/89 R |
| 3,982,104 | 9/1976 | Banner | 235/88 N |

Primary Examiner—Paul A. Bell
Attorney, Agent, or Firm—Holman & Stern

[57] ABSTRACT

A tidal time indicator for determining tide times at various locations on a specific stretch of coastline comprises a pair of complementary charts. One of the charts is in the form of a map having index marks representing the various locations and which marks are spaced apart at distances corresponding to the known tidal time differences between the particular locations. The other chart is in the form of a rule having a time scale and index marks representing different days, each of these index marks being positioned relative to the time scale at the high or low tide time on the particular day for a reference location on the map chart. Thus, by positioning the rule chart relative to the map chart so as to register a date mark with an index mark on the map chart representing the reference location, the tide times at the other map locations can be read directly off the time scale adjacent their respective index marks on the map. To prepare the charts, information is obtained from Tide Tables.

9 Claims, 4 Drawing Figures

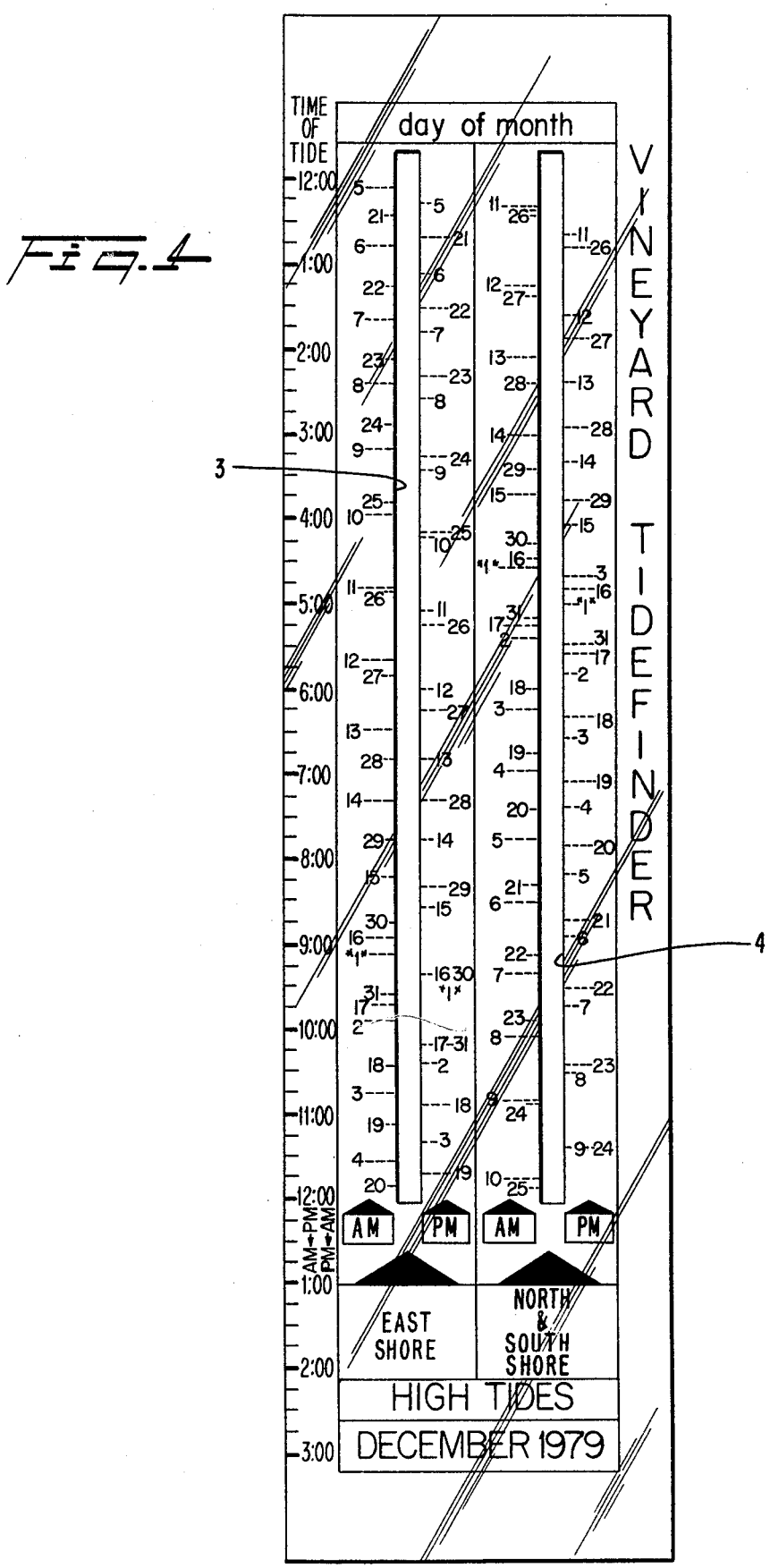

TIDE TIME INDICATOR

BACKGROUND OF THE INVENTION

This invention relates to a device for indicating the times of high or low tides at specific location along a stretch of coastline.

Tide Tables such as those issued annually by the U.S. Department of Commerce give complete listings for high and low tide times for each day of the year for major locations in a particular coastal area. For other locations however, no complete listings are given in the Tide Tables, although the Tables do give the general relationship in terms of time between certain such locations and one of the major locations for which a complete listing is given. Accordingly, to determine the time of a tide in one of the fully listed locations, it is necessary to consult the relevant listing; or to compute the time of a high or low tide at one of the other locations, it is necessary to consult the Tables to determine the tidal time difference between the required location and a fully listed location, then to consult the table for the day in question for the fully listed location and make the required addition or subtraction of time necessary for the location under review.

Knowledge of tide time is necessary for certain individuals such as fishermen and yachtsmen and it would be advantageous to such people to have available an expedient whereby the tide times at specific locations could be readily determined without the necessity for consulting the Tide Tables for a listed location and in the case of a non-listed location, making the necessary arithmetic calculations.

Accordingly, it is an object of the instant invention to provide a device for indicating tide times at specific locations which obviates the necessity to consult Tide Tables.

It is a further object of the invention to provide a tide time indicator which can be used to readily determine either high or low tide, A.M. or P.M. at any one of a number of specific locations for any day of a calendar year, such locations having a known tidal time relationship to a location having its tide times fully listed in the Tide Tables.

Another object of the invention is to provide a device of the above character which is simple to use and which is readily transportable.

A further object of the invention is to provide a device of the above character which is attractive to the eye and which can be constructed in the form of a novelty or souvenir to be sold in tourist or like stores at any one of the locations for which the device is intended to function.

A still further object of the invention is to provide a tidal time indicator which is more accurate than previously known tidal calculators. Such previously known devices (see, for example, Dutch Patent Specification No. 7609072 and U.S. Pat. Nos. 3,982,104 3,825,181 and 3,745,313) have been based on the principle of utilizing the mean difference between daily lunar and solar cycles and are accurate in the mean but ahead of the actual tide time for some calculations and behind the actual tide time for other calculations.

Yet another object of the invention is to provide a device for determining tide times at specific locations which device is economical and relatively simple to manufacture from readily available materials.

SUMMARY OF THE INVENTION

The invention is based upon the principle of utilizing Tide Table information to prepare a pair of chart-like members for a plurality of specific locations whose tide times have a known relationship to one another and whose actual tide times are known or can be derived from the Tide Tables. One of the members is generally in the form of a map and the other in the form of a scale or rule, and the members are manipulated one with the other whereby by suitable relative positioning of the two members, the time of a tide at a particular location on a particular day can be simply read off from one of the members without having to perform any arithmetic calculation.

In the simplest form of the invention, the map-like chart has a reference index mark representing a reference location and a further index mark representing another location, the distance between the index marks representing the difference in time between tides at the reference location and the other location. The other chart is in the form of a rule having index marks indicating real time which are spaced apart to the same scale as the index marks on the first chart. Accordingly, knowing the time of the tide at the reference location, if this time on the second chart is placed in register with the reference index mark on the first chart, then the tide time at the other location can be read off from the second chart adjacent the further index mark on the first chart.

In a development of the invention, the rule-type chart is provided with a further series of index marks representing days of the month, these index marks being correlated in position to the real time marks to correspond to the tide times on the particular dates for the reference location. Thus, by placing a date mark in register with the reference index mark on the map chart, the tide time for that date at a location under review can be read off on the rule chart adjacent the index mark on the map chart representing that location.

A practical embodiment of the invention preferably will include a map chart having index marks representing both high and low tides for a plurality of different locations and one or more reference index marks depending on whether in the Tide Tables each of these locations is referenced to the same reference location or to different reference locations. Further, there will preferably be a plurality of rule charts, each for a different month of the year, and each enabling information to be obtained regarding both high and low tides, A.M. and P.M. at each of the mapped locations.

The charts may conveniently be made from wood or flexible sheet material (paper, cardboard, thin plastic sheet or the like) and it will be seen that the invention allows a user accurately to determine the tide times at any of the specific locations in a mapped area without having to resort to the use of Tide Tables or any form of arithmetic calculation, but merely by suitably relatively positioning the two charts.

DESCRIPTION OF DRAWINGS

FIG. 4 is a representation of one of a series of similar rule-type charts for use in conjunction with the map-type chart depicted in FIG. 3.

DESCRIPTION OF PREFERRED EMBODIMENTS

It is to be appreciated at the outset that while the following description relates to a particular coastal area, namely, Martha's Vineyard, Massachusetts, this area is chosen for illustrative purposes only in describing the principles of the invention. The invention is in no way intended to be restricted in its scope to this particular coastal area of the United States but rather can be extended to any other coastal area of the United States or any other country or land mass for which Tide Table information is available.

The basic principles of the invention are described with reference to FIGS. 1 and 2.

The U.S. Department of Commerce Tide Tables 1979 edition on pages 40 through 43 lists the times of high tides at Newport, Rhode Island for 1979. The same document on pages 209 and 210 shows that at Squibnocket Point, Martha's Vineyard (Point A on the map-type chart depicted in FIG. 1) the tide will be high 42 minutes before it is high at Newport. Off Chilmark Pond (Point B in FIG. 1) the tide will be high 13 minutes before it is high at Newport. Off Job's Neck (Point C) the tide will be high 4 minutes after it is high at Newport, and at Wasque Point (Point D) the tide will be high 125 minutes after it is high at Newport.

Figure 1:
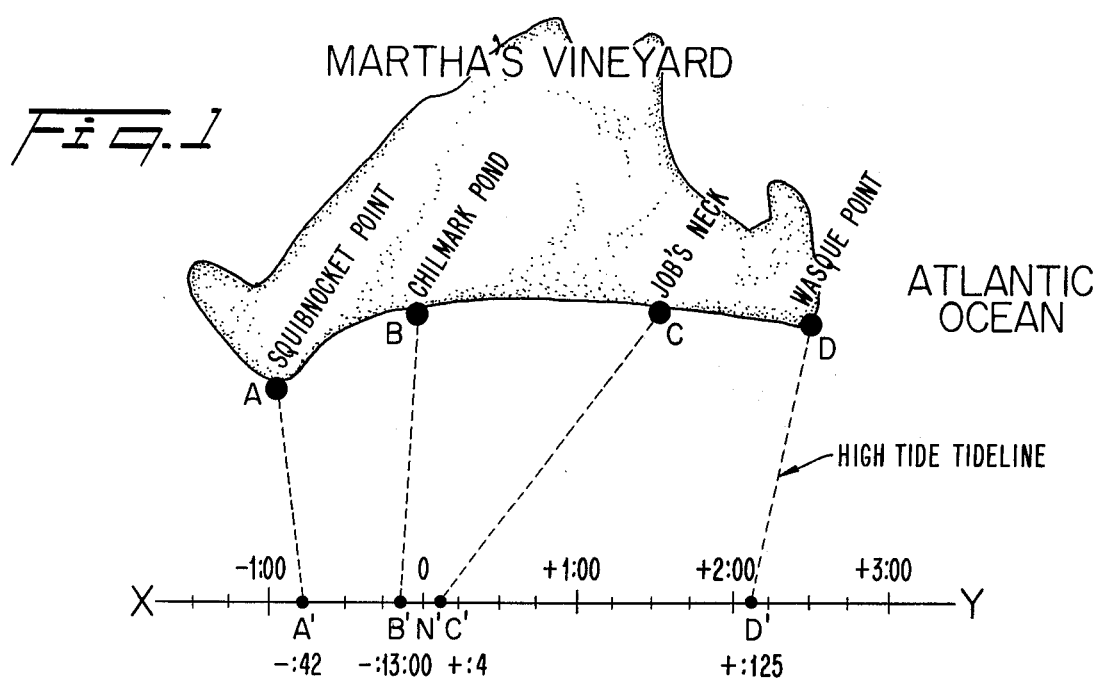
FIG. 1 is a representation of a map-type chart forming part of a device in its basic form for indicating tide times at certain specific locations along the beach of Martha's Vineyard, Massachusetts.

Line XY on FIG. 1 is a time scale, with for example, one inch representing one hour and on which are index marks representing the above locations and a reference index mark representing Newport, Rhode Island. Thus, N' is the reference index mark representing Newport and located on line XY at time zero. A' is the index mark representing location A and is located on line XY at −42 minutes, B' is the index mark representing location B and is located on line XY at −13 minutes, C' is the index mark representing location C and is located on line XY at +4 minutes and D' is the index mark representing location D and is located on line XY at +125 minutes.

Figure 2:
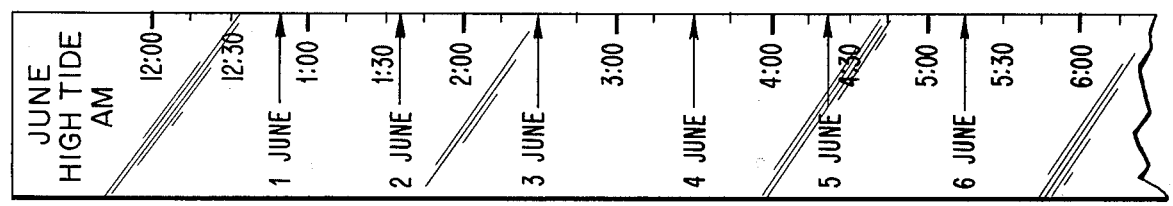
FIG. 2 is a representation of a rule-type chart for use with the map-type chart of FIG. 1.

FIG. 2 shows a rule-type chart for use with the map-type chart depicted in FIG. 1. It will be seen that the rule has a series of spaced index marks representing hours and the scale of these marks is the same as the scale to which line XY is drawn in FIG. 1, i.e., in the example quoted, 1 inch to the hour. Thus, when the rule is laid along line XY in such a position that the known time of a high tide at Newport on a particular day is in register with the reference index mark N', then the high tides for locations, A, B, C and D for the particular day can be read off from the rule adjacent index marks A', B', C' and D' respectively.

The map-type chart of a type shown in FIG. 1 having spaced index marks N', A', B', C' and D' and the rule-type chart as shown in FIG. 2 having real time index marks spaced on the same scale as the marks on the map-type chart form the basic components constituting the present invention. FIG. 2 however illustrates a further refinement namely a second series of index marks representing different days, the marks in this second series each being correlated in position with respect to the real time marks to accurately reflect the Newport A.M. high tide time on the particular date specified. Thus, for example, the Newport A.M. high tide time on June 4th, 1979, is at approximately 3:30 A.M. (DST) and the rule is marked accordingly as shown.

With this arrangement, to determine the A.M. high tide time on a particular day at any one of the locations A, B, C or D, the date mark on the rule is placed adjacent reference mark N' and the tide time is read off the rule adjacent one of the index marks A', B', C' or D'.

To find the time of a tide at any point between a pair of the marked locations, the tide times of each location can be determined and the tide time at the required point can be estimated on the basis of distance being approximately proportional to time for the relatively short distances involved.

The example illustrated in FIGS. 1 and 2 relates to the determination of high tides at certain locations based on their known time relationship to high tides at a reference location, in the case illustrated, Newport, R.I. Low tides at these locations also bear a specific but different time relationship to low tides at Newport and accordingly, a device for indicating low tides at the illustrated locations would have a different set of index marks on line XY representing the respective time differentials between low tides at Newport and at the different locations, A, B, C and D. Also, in the rule depicted in FIG. 2, low-tide date marks would be differently positioned in relation to the real time marks to reflect the times of low tides at Newport on the particular days.

In a practical embodiment of the invention, it is desirable to be able to determine both A.M. and P.M. high and low tides at a number of locations for every day in a calendar year. For this application it is expedient to provide a single map-type chart and a series of rule-type charts each giving information for a single month, so that the rules are used in turn with the map-type chart as the year progresses. Such an embodiment is described with reference to FIGS. 3 and 4.

Figure 3:
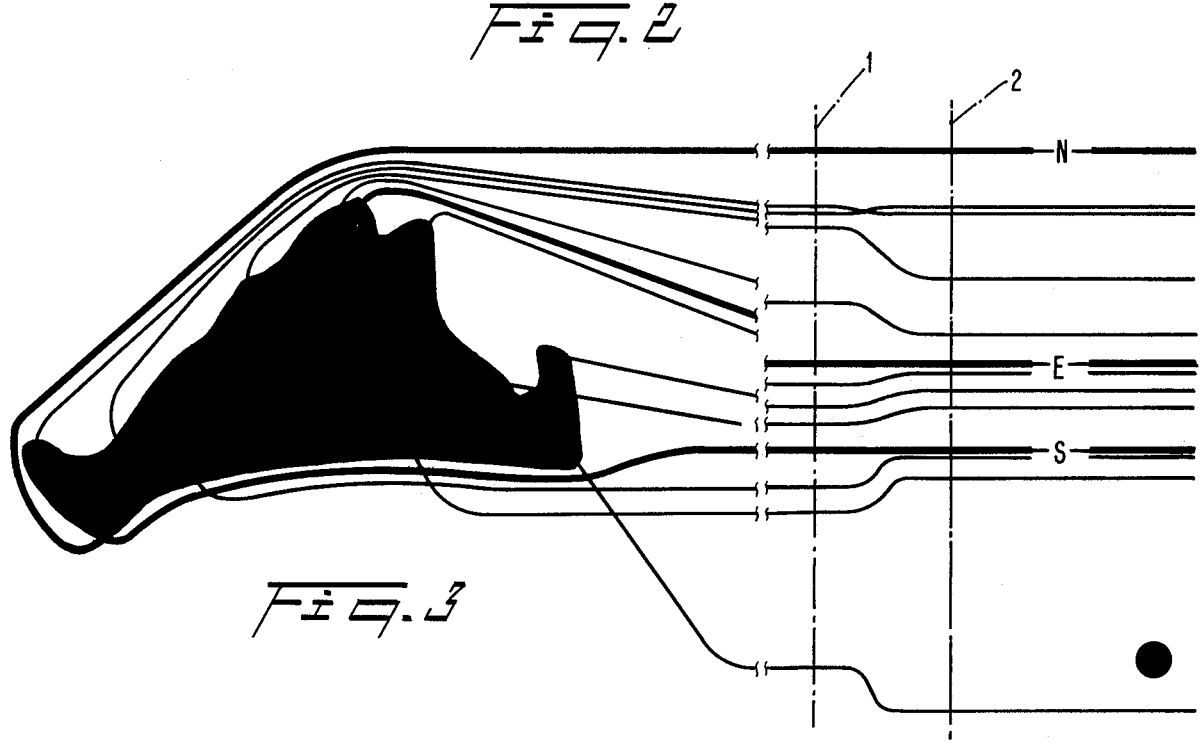
FIG. 3 is a representation of another map-type chart forming part of a more complex device for determining tide times at specific locations around Martha's Vineyard.

FIG. 3 shows a map-type chart for use in determining tide times at specific locations around Martha's Vineyard. In this case, the line XY of FIG. 1 is omitted and lines extending from the various locations are themselves used to provide the various index marks, these lines being suitably spaced apart to take into account the time relationship between tides at the various locations. Moreover, it will be noted that the spacing between the lines is different on axis 1 than on axis 2, and this is to take into account the different tidal time relationships between high and low tides as between the various locations. Furthermore, in this example ther is no reference index mark representing tide times at Newport, R.I. as in FIG. 1, since the rule-type chart of FIG. 4 (to be explained in more detail below) is referenced to specific locations (shown in heavy lines) on the map-type chart.

For Martha's Vineyard, the tides along the North shore and South shore are keyed in the Tide Tables, as previously described, with reference to tide times at Newport, R.I., whereas the tides along the East shore are keyed to Boston, Mass. Accordingly, the map-type chart is compiled from Tide Table information on tidal time relationships to reference all East shore locations to index mark E, all South shore locations to index mark S, and all North shore locations to index mark N. (South and North shore locations have different index marks simply as a matter of expediency in designing the chart in order to avoid a multiplicity of crossing lines).

The rule-type chart shown in FIG. 4 has a pair of vertical slits 3 and 4 which in use are placed over the lines of the map-type chart so that the index marks N, E, and S are visible through the slit being used. For North and South shore locations, the right hand slit 4 is used and this lines up the left edge of the rule-type chart with axis 1 on the map-type chart. (Axis 1 and 2 do not appear on the chart as manufactured and are included in FIG. 3 as an aid to understanding the invention.) Then, to find the time of an A.M. or P.M. low or high tide on a North or South shore location on a particular day, the index mark representing that day and which appears on the left or right hand side of slit 4 (depending on whether an A.M. or P.M. high tide is required) is aligned with the N or S reference index mark on the map, and the time of the A.M. or P.M. high tide is read off on the time scale along the left edge of the rule.

It will be noted that in the map-type chart depicted in FIG. 3, certain of the map locations themselves are used for the N, S and E reference index marks rather than using separate marks representative of Newport and Boston respectively. This is achieved by the proper positioning of the date index marks on the rule-type chart relative to the time scale to reflect the actual time of tides at the reference locations by making the necessary calculation adjustment from the tide times at Newport and Boston respectively.

For East shore locations, the left hand slit 3 is used to register with index mark E, lining up the left edge of the rule with axis 2. Again, to find an A.M. or P.M. high tide at an East shore location, on a particular day, the relevant date on the left or right hand side of slit 3 is aligned with index mark E and the time is read off the time scale where it is intersected by the line emanating from the required location.

The particular chart illustrated in FIG. 4 is for A.M. and P.M. high tides for December, 1979. It will be understood that a further similar chart can be constructed for A.M. and P.M. low tides for the month in question for use in conjunction with the FIG. 3 chart, and that further charts can be constructed for use with the FIG. 3 chart for other months.

It will be noted from the described embodiments that the charts are compiled from information obtained from Tide Tables and can either be referenced to a location (such as Newport in FIGS. 1 and 2) which does not itself appear on the charts but from which the tide times at the mapped locations are derived or alternatively, as in the case of FIGS. 3 and 4, the charts, while being derived from information related to a reote location (Newport and Boston) can be referenced to one or more of the mapped locations by suitable positioning of the date marks relative to the time marks on the rule-type chart, taking into account the known tidal time relationship between the reference location and the remote location.

While only two embodiments of the invention have been described in detail, it is to be understood that the invention is not limited to the specific details herein described and numerous modifications can be made within the scope of the appended claims. For example, while the map and rule-type charts have been described as separate entities, it is possible to incorporate these charts into a single sheet and adjust the interpositioning of the charts as required by suitable folding of the sheet.

Further, while the invention has been described herein, as relating to the determination of tide times at specific beach locations based on information derived from Tide Tables, the principles of the invention are equally applicable to the determination and indication of ocean current times. In this application, information is derived from ocean current tables rather than Tide Tables, these being referenced to specific ocean buoys rather than beach locations, and the two charts are constructed accordingly with the index marks on the map-like chart representing buoys rather than beach locations. Accordingly, in the attached claims, the term "tide" should be construed as covering a tide or current and the term "location" refers to a beach location or an ocean buoy as the case may be.

The embodiments of the invention in which an exclusive property or privilege is claimed are defined as follows:

1. A device for indicating the time of a tide at any or at least one of a plurality of locations having a known tidal time relationship to one another, the device comprising a pair of cooperative charts including a first time-based chart having spaced index marks representing the respective locations, the distance between a pair of the marks being representative of the tidal time difference, to a particular scale, between the locations which the marks represent; and a second timebased chart having index marks representing real time and spaced apart to the same scale as the index marks on said first chart, whereby by positioning an index mark on the second chart representing the known time of a tide at one of said locations in register with an index mark on said first chart representing said one location, the time of the tide at another of said locations can be read off from said second chart adjacent an index mark on said first chart representing said another location.

2. The device of claim 1 wherein said second chart has further index marks representing different days, said further index marks being positioned in correlation to the index marks representing real time, each to indicate the actual time of a tide on a particular day at said one location, whereby by positioning one of said further index marks representing a particular day in register with the index mark on said first chart representing said one location, the time of the tide on said particular day at said another location can be read off said second chart adjacent the index mark on said first chart representing said another location.

3. The device of claim 1 or claim 2 wherein said first chart has first and second index marks for each locations, said first index marks being spaced to represent the time differential between low tides at the respective locations and the second index marks being spaced to represent the time differential between high tides at the respective locations.

4. The device of claim 3 wherein said second chart has a first series of further index marks representing different days and positioned in correlation to the index marks representing real time each to indicate the time of a low tide on a particular day at said one location and a second seris of further index marks representing different days and positioned in correlation to the index marks representing real time each to indicate the time of a high tide on a particular day at said one location.

5. The device of claim 3 including a plurality of said second charts each compiled with said first and second series of index marks for the days of a different month of a calendar year.

6. The device of claim 2 wherein said first chart has a plurality of index marks representing locations illustrated on said first chart and a further reference index mark representing a remote location not illustrated on said first chart and wherein said further index marks on said second chart are positioned in correlation to said index marks representing real time each to indicate the actual time of a tide on a particular day at said remote location.

7. The device of claim 2 wherein said first chart has a plurality of index marks representing locations illustrated on said first chart and said further index marks on said second chart are positioned in correlation to said index marks representing real time each to indicate the actual time of a tide on a particular day at one of said illustrated locations.

8. The device of claim 1 wherein said first chart includes a plurality of illustrated locations and a line extending from each of said illustrated locations, said line having portions spaced apart at distances representing the tidal time difference, to said particular scale, between said illustrated locations, said line portions forming the index marks representing the respective illustrated locations.

9. The device of claim 8 wherein said lines have first portions spaced to represent high tide time differentials between the respective illustrated locations and second portions spaced to represent low tide time differentials between the respective illustrated locations.

* * * * *